Dec. 10, 1968 L. VIESI 3,415,944

AUTOMATIC MULTIPLE-CODE SYSTEM FOR LONG DISTANCE INFORMATION

Filed Feb. 19, 1964 2 Sheets-Sheet 1

INVENTOR
LORENZO VIESI

BY Young + Thompson

ATTORNEYS

AUTOMATIC MULTIPLE-CODE SYSTEM FOR LONG DISTANCE INFORMATION

Filed Feb. 19, 1964 2 Sheets-Sheet 2

INVENTOR
LORENZO VIESI
BY Young & Thompson
ATTORNEYS

United States Patent Office 3,415,944

Patented Dec. 10, 1968

3,415,944

AUTOMATIC MULTIPLE-CODE SYSTEM FOR LONG DISTANCE INFORMATION

Lorenzo Viesi, Rome, Italy, assignor to Sintelco Societa a resp. Limitata, Rome, Italy, a firm Filed Feb. 19, 1964, Ser. No. 345,898

Claims priority, application Italy, Feb. 28, 1963, 4,008/63

2 Claims. (Cl. 178—3)

ABSTRACT OF THE DISCLOSURE

An automatic electronic system for the reception and transmission of information coded according to any of a number of different standards (multiple code information) of code is compatible with the standard CCITT No. 2 code. That known code operates on five units or bits and therefore permits only 32 combinations. The present invention, however, adds another 32 combinations by introducing one negative bit, the sixth, between the five significant bits and the positive stop. A third group of 32 combinations is obtained by inserting two negative bits (the sixth and a seventh) between the five significant bits and the positive stop, and so on.

The present invention relates to an automatic electronic system to receive and transmit information coded by many different standards of code. The system is able to automatically identify the bit number of the code character under scrutiny, beginning from the five-bit telegraph code (CCITT No. 2) normally used for telegraphic communications, and to recognize during the stop bit, whether the code character in question appertains to the standard CCITT or to another six-bit standard code with a negative sixth bit so that during the time lapse established for the five-bit coded signals it is possible to switch this signal automatically toward the decoding, translating and output device of the five-bit standard code or toward that of the six-bit standard code. If the signals concerned are in a five-bit standard code, they are recognized as such and treated according to the standards of the CCITT No. 2 Telegraph Code, inasmuch as the sixth bit, if recognized as positive, counts as a "stop" for the five-bit standard code and immediately closes, without awaiting the successive bit, the character cycle, while, if this sixth bit is recognized as negative, it counts as a sixth bit of the six-bit standard code and automatically causes switching toward the devices of the six-bit standard code and simultaneously lets the character cycle for the recognition of the successive bit go on. If that successive bit is recognized as positive, it counts as a stop for the six-bit standard code and immediately closes the cycle, automatically causing switching toward the decoding and output device of the six-bit standard code while, if it is recognized as negative, it counts as the seventh bit of a seven-bit standard code according to the same procedure and so forth, without any limitation in the number of alphabets, each of which has 32 combinations, as in the CCITT No. 2 alphabet. These are automatically received or transmitted with proper telegraphic character duration and automatically switched from one into the other standard, with no necessity for switching code signals (or calling code signals) and irrespective of the successive utilization of the single combinations of the various alphabets thus formed. These combinations however may be used as additional character of a more extended alphabet or for services of various kinds, permitting the system to be used in equivalent way with a five bit, six bit or more bit teletypewriter.

Figure 1:
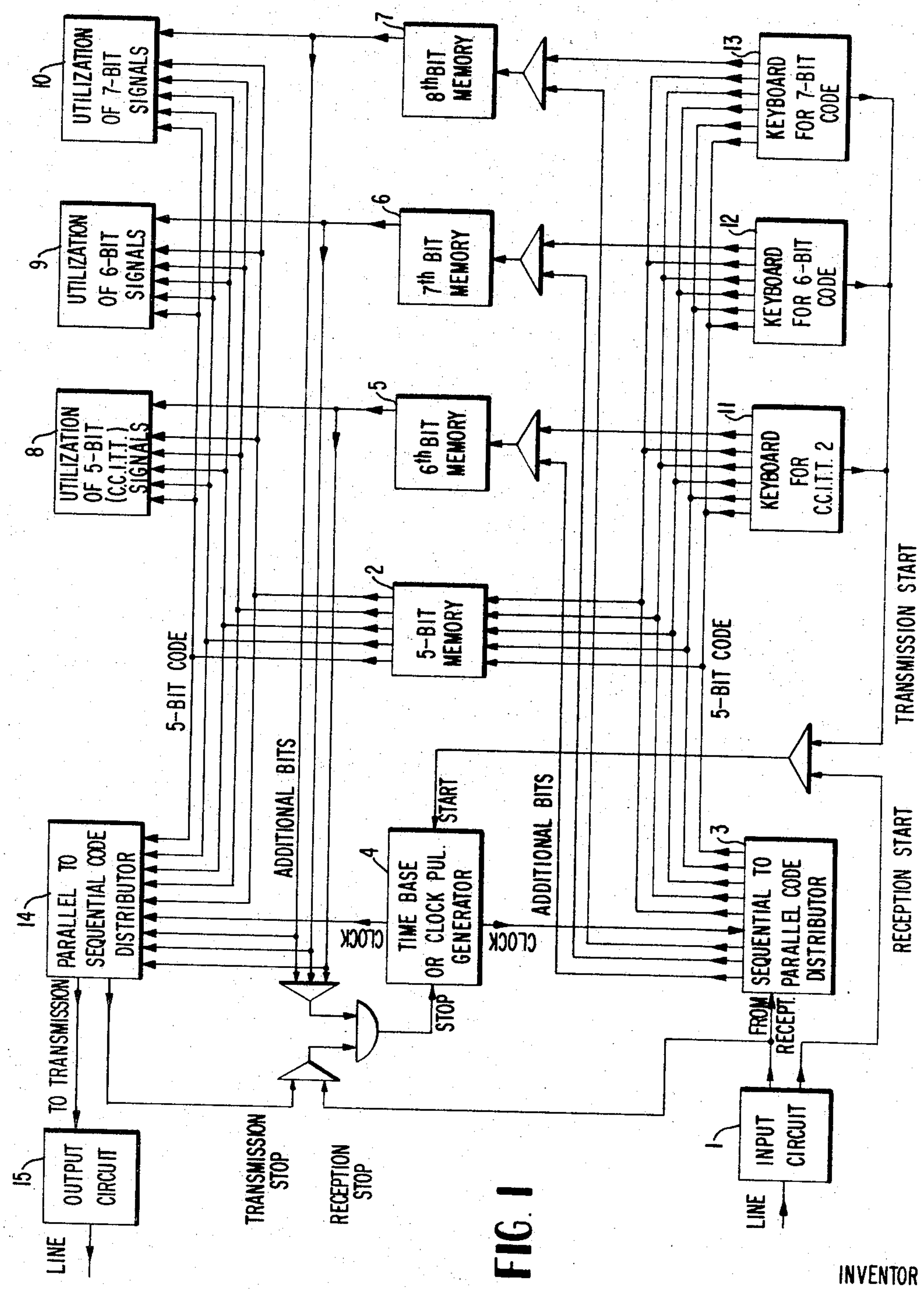
FIGURE 1 illustrates the system of the present invention in a diagrammatic explanatory and not limitative form, and separately for its operation as a receiver and a transmitter, as exemplified in one of the many possible embodiments of said system.
Figure 2:
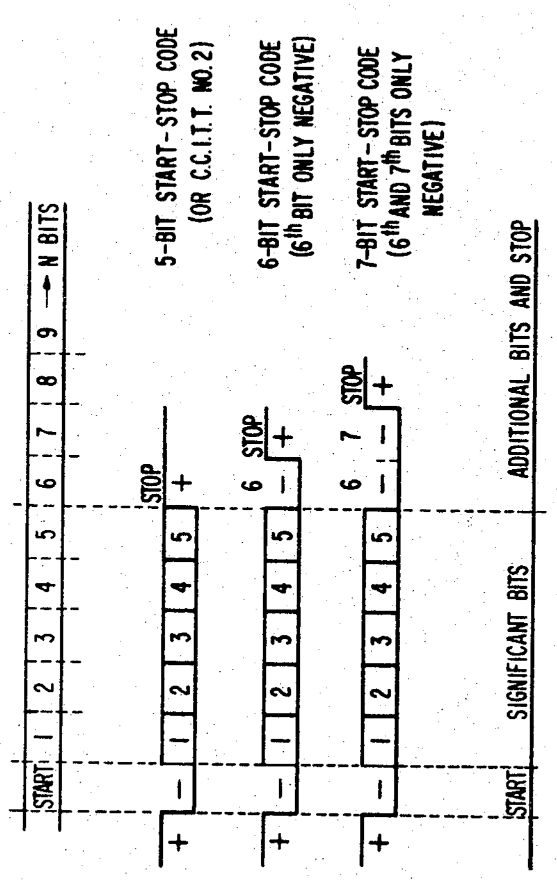
FIGURE 2 is a diagram of the code-handling capability of the system of the present invention.

As a receiver, its operation is as follows:

The telegraphic signal enters the receiver 1 and the single bits are distributed in the code character memory 2 by means of a code distributor 3 piloted by a time base 4 released at the start.

The sixth bit and the possible successive ones are distributed on subsidiary memories consisting in sample bistable multivibrators 5, 6, 7.

If the sixth bit is positive, it counts as a stop and the bistable multivibrator 5 is tripped and stops the time base 4 and causes the code character stored in the memory 2 to be transferred toward the code-using device 8 consisting of the printing elements for the CCITT No. 2 alphabet. Thereupon the whole apparatus is restored to the initial conditions, ready to receive a new signal.

If the sixth bit is negative, the bistable multivibrator 5 is not tripped and the time base 4 continues until the seventh bit enters.

If the seventh bit is positive, the bistable multivibrator 6 is tripped and stops the time base 4, causing the code character stored in the memory 2 to be transferred toward the other user device 9, which is formed, for example, by mechanism for automatic services or other printing mechanism; whereupon the whole apparatus returns to its initial conditions, ready to receive a new signal.

If, instead, the seventh bit is negative, the bistable multivibrator 6 is not tripped and the time base continues until the successive bit enters.

The procedure continues identically up to the maximum of the bits to be foreseen.

As a transmitter, the operation is the following:

The telegraphic signal to be transmitted is set by one of the keyboards 11, 12, 13 into the code character memory 2 and into the respective subsidiary single bit memory 5, 6, 7.

At the instant of the setting into the memory, the time base 4 is released, which, through a code distributor 14 and a transmission device 15 (such as telegraph relay) emits in sequence the bits of the code character stored in the memories 2, 5, 6, 7.

After the five bits stored in the five bit memory 2 have been transmitted, the time base 4 continues until the unique positive bit stored in one of the bistable multivibrators 5, 6, 7 has been emitted as stop.

The emission of this positive bit stops the time base 4 and brings about the issue of the bits still stored in the memory 2, towards the user device 8 or 9 or 10 corresponding to the bistable multivibrator 5, 6, 7, which has given the stop bit, for the local printing control; whereupon the whole apparatus reverts to its initial conditions, ready to receive or transmit a fresh character.

What I claim is:

1. An automatic electronic system for the reception and transmission of information coded according to any of a number of different standards of code, comprising means for receiving and transmitting a start negative bit, means for receiving and transmitting five succeeding significant bits, means for receiving and transmitting a further variable number of additional succeeding negative bits, and means for receiving and transmitting at last a stop positive bit, in order to permit the promiscuous and compatible use of many different standards of code so that the total number of the code characters or combinations is multiplied.

2. A system as claimed in claim 1, including means for receiving sequential signals, means to convert said sequential signals to parallel code, a start-stop time base generator and an associated distributor counter, a plurality of registering means respectively connected to the outputs of the distributor counter, said means being subdivided into two groups one of which is associated with said five bits and the other of which is associated with succeeding bits, means for starting the time base generator at the start of a signal and means for stopping it in consequence of the identification and registration of the positive stop bit on any said registering means of said second group, means for connecting said first group of registering means with a plurality of utilization devices each one for a type of code comprising 32 combinations in accordance with the selected operation of said registering means of the second group, means for transmitting multiple code signals comprising a plurality of keyboards one for each of said plurality of codes, means to connect the keyboards with said first group of registering means and a said second group of registering means, means for starting the time base generator upon keyboard operation, means to convert the parallel code registered in the two groups of registering means to sequentially transmitted signals, and means for selectively connecting said registering means to an output transmitting circuit and for stopping the time base generator upon transmission of a positive bit registered on said second group.

References Cited

UNITED STATES PATENTS

| | | | |
|---|---|---|---|
| 2,601,239 | 6/1952 | Bessonet et al. | 178—3 |
| 2,708,744 | 5/1955 | Neiswinter | 178—4 |
| 2,973,507 | 2/1961 | Grondin | 178—2 |

THOMAS A. ROBINSON, *Primary Examiner.*

U.S. Cl. X.R.

178—26; 340—168